United States Patent Office 3,652,627
Patented Mar. 28, 1972

3,652,627
CYANOACETIC SILICON ALCOHOL ESTERS AND METHOD FOR PREPARATION OF SAME
Francois Meiller, Palaiseau, France, assignor to Societe Industrielle des Silicones, Paris, France
No Drawing. Filed June 19, 1969, Ser. No. 834,895
Claims priority, application France, June 21, 1968, 155,984
Int. Cl. C07f 7/10
U.S. Cl. 260—448.2 N
10 Claims

ABSTRACT OF THE DISCLOSURE

Cyanoacetic esters of silicon alcohols having thhe general formula

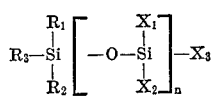

in which $R_1$, $R_2$ and $R_3$, which may be the same or different, represent an alkyl group containing from 1 to 3 carbon atoms, $X_1$, $X_2$ and $X_3$, which may be the same or different, represent an alkyl halogenoalkyl or cyanoacetoxyalkyl group in which the alkyl residue has from 1 to 3 carbon atoms, phenyl or halogenophenyl group, in which at least one of the groups is a cyanoacetoxyalkyl group and $n$ is a whole number of from 1 to 40 in which the ester is produced by reacting a mono- or polyfunctional silicon alcohol with cyanoacetic acid or alkyl cyanoacetate or with cyanoacetic acid and a hexaalkyldisiloxane. The novel compounds are useful as hydraulic-fluids, lubricants, and coatings for glass fibers.

---

This invention relates to cyanoacetic esters of silicon alcohols and to the preparation of same.

In accordance with the prior art, certain cyanoacetic esters of silicon alcohols are known which, according to the teachings of the German Pat. No. 1,199,772, are obtained by reacting cyanoacetic acid with bromomethylsiloxane in the presence of an amine. However, the reaction, described in Example 2 of the German patent, gives relatively low yields of cyanoacetic esters, in the order of 55% by weight. In addition, bromohydric acid is released and is required to be neutralized.

It is an object of this invention to obviate these inconveniences an to produce and to provide a method for producing cyanoacetic esters of silicon alcohols which may possess halogenoalkyl or halogenoaryl substitutes, and it is a related object to provide a process of the type described which gives high yield and which does not form secondary acid products that require neutralization.

In accordance with the practice of this invention, the cyanoacetic esters of silicon alcohols have the following general formula:

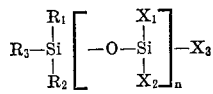

in which $R_1$, $R_2$ and $R_3$, which may be the same or different, represent an alkyl group containing from 1 to 3 carbon atoms; $X_1$, $X_2$ and $X_3$, which may be the same or different, represent an alkyl halogenoalkyl, cyanoacetoxyalkyl group in which the alkyl residue has from 1 to 3 carbon atoms, phenyl, halogenophenyl group, but in which at least one of the substitutes $X_1$, $X_2$ or $X_3$ is a cyanoacetoxyalkyl group and in which $n$ is a whole number from 1 to 40.

The $X_1$ and $X_2$ groups in the chain connection

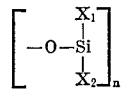

may vary from one silicon atom to another adjacent silicon atom in the chain but in which $X_1$ and $X_2$ remain as previously defined.

The cyanoacetic esters of silicon alcohols are liquid compounds, the viscosity of which is a function of the value of $n$.

The method of preparation of the esters, in accordance with the practice of this invention, consists in carrying out a reaction: either—
(a) Between a mono- or polyfunctional silicon alcohol and cyanoacetic acid or alkyl cyanoacetate; or
(b) Between a polyfunctional silicon alcohol, cyanoacetic acid and a hexaalkyl disiloxane.

Method (a)

The reaction of mono- or polyfunctional silicon alcohol with cyanoacetic acid or alkyl cyanoacetate, whereby the alkyl group contains from 1 to 5 carbon atoms, is carried out at a temperature within the range of 35° C. to the boiling temperature of the reaction mixture. Thereafter the water or the alcohol formed is separated.

The initial silicon alcohol is represented by the general formula:

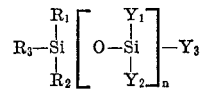

in which $R_1$, $R_2$ and $R_3$, which may be the same or different represent an alkyl group containing from 1 to 3 carbon atoms; $Y_1$, $Y_2$ and $Y_3$, which may be the same or different, represent an alkyl, halogenoalkyl, hydroxyalkyl group in which the alkyl residue contains from 1 to 3 carbon atoms, phenyl or halogenophenyl group, but in which at least one of the substituents $Y_1$, $Y_2$ or $Y_3$ is a hydroxyalkyl group and $n$ is a whole number between 1 and 40.

The groups $Y_1$ and $Y_2$ in the chain

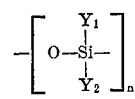

may vary from one silicon atom to another adjacent in the chain but remains defined as previously indicated.

Representative of the silicon alcohols which may be used as starting materials are hydroxymethylpentamethyldisiloxane,
hydroxyethylpentamethyldisiloxane,
hydroxypropylpentamethyldisiloxane,
hydroxymethyltrimethyldiethyldisiloxane,
dihydroxymethyltetraethyldisiloxane,
hydroxymethyl(trifluoropropyl)tetramethyldisiloxane.

The cyanoacetic acid or the alkyl cyanoacetate is added in stoichiometric quantities with respect to the OH functions to be esterified. However, it is possible to make use of an excess of cyanoacetic acid or alkyl cyanoacetate in relation to theory in which the excess may range up to 10% above the theoretical quantity.

According to a preferred embodiment of the invention, the reaction is carried out in the presence of an acid catalyst, such for example as paratoluene-sulphonic, sulphuric, hydrochloric acids, in proportions ranging from 0.01% to 5% by weight in relation to the silicon alcohol used as starting material. It is also possible to make use, as a preferred catalyst, of an activated clay having a pH in the order of about 4. Use thereof can be made in quantities varying from 1% to 40% and preferably 5% to 15% by weight in relation to the silicon alcohol that is used.

When cyanoacetic acid is used, the water formed during the reaction may be eliminated at the end of the reaction but it is preferred to effect separation of the water as it is formed. Water separation may be effected by any means known to the skilled in the art, such as by decantation, distillation, evaporation under vacuum, absorption by a hydrophile material, and preferably by azeotropic distillation. In the latter case, the product forming an azeotrope with the water should have, under normal pressure, a boiling temperature within the range of 35° to 150° C. Such compounds may, for example, be pentane, hexane, benzene, toluene, or xylene.

The reaction time, which depends upon the product used, the temperature and the presence or absence of catalyst, is generally within the range of about 1 to 8 hours.

If an alkyl cyanoacetate is used, the alcohol formed during the reaction can be eliminated at the end of the reaction, but it is preferred to remove the alcohol as it is formed. The separation of alcohol can be achieved by any means known to the skilled in the art, such as by dissolution in water, evaporation under vacuum, and more specifically by distillation.

The reaction time, which is a function of the same variables referred to in the case of cyanoacetic acid, is usually within the range of 3 to 15 hours.

After the reaction, the catalyst, when present, is separated by any known means, such as by neutralization, distillation under vacuum (in the event that it is volatile), or by filtration (in the event that it is a solid). Then the compound which forms an azeotrope, when present, is eliminated by distillation to isolate the product.

Method (b)

In accordance with the invention, the reaction of polyfunctional silicon alcohol with cyanoacetic acid and hexaalkyl disiloxane, in which the alkyl group contains from 1 to 3 carbon atoms, is carried out at a temperature within the range of 35° C. to the boiling temperature of the reaction mixture. The reaction is carried out in the presence of an acid catalyst and subsequently the reaction water and the catalyst are separated.

The silicon alcohol used as the starting material may be represented by the following general formula:

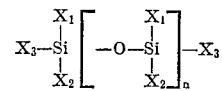

in which $Y_1$ and $Y_2$, which may be the same or different, represent an alcohol, halogenoalkyl, hydroxyalkyl group in which the alkyl residue contains from 1 to 3 carbon atoms, phenyl, halogenophenyl group, Z represents a hydroxyalkyl group in which the alkyl residue contains 1 to 3 carbon atoms and $n$ is a whole number between 1 and 40.

The $Y_1$ and $Y_2$ groups in the chain

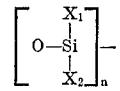

may vary from one silicon atom to another adjacent silicon atom in the chain but remain defined as has just been indicated.

The silicon alcohols may be represented by bis(hydroxymethyl)tetramethyldisiloxane,
tetrakis(hydroxymethyl)dimethyldisiloxane,
bis(hydroxymethyl)tetrakis(trifluoropropyl)disiloxane,
bis(hydroxymethyl)tetraphenyldisiloxane,
bis(hydroxymethyl)octamethyltetrasiloxane,
bis(hydroxymethyl)hexacosimethyltridecisiloxane,
bis(hydroxymethyl)tetra(chlorophenyl)disiloxane.

The hexaalkyldisiloxane may be represented particularly by hexamethyldisiloxane, hexaethyldisiloxane, hexapropyldisiloxane, trimethyltriethyldisiloxane, trimethyltripropyldisiloxane, tetramethyldiethyldisiloxane, tetraethyldimethyldisiloxane, pentamethylethyldisiloxane. Two to five times the theoretical quantity of 1 mole of hexaalkyldisiloxane per 1 mole of silicon alcohol is used.

The quantity of cyanoacetic acid, catalyst, the separation of the water formed, the reaction time and the separation of catalyst are the same in method (b) as in method (a) when operating with cyanoacetic acid. During the reaction, the hexaalkyldisiloxane, in the presence of acid catalyst, causes cutting of the chain of the silicon alcohol and of the hexaalkyldisiloxane. The formation of a product, in accordance with the practice of this invention, is obtained by fixation of each of the two halves resulting from the cutting of the hexaalkyldisiloxane mole on each of the two parts resulting from the cutting of the silicon alcohol chain.

When this reaction is carried out with silicon alcohol having more than two silicon atoms, a mixture of cyanoacetic esters is obtained which contains a variable number of silicon atoms, at least equal to two. On the other hand, when the reaction is carried out with a silicon alcohol which contains only two silicon atoms, one or several cyanoacetic esters are obtained, depending somewhat upon the nature of the substituents bound to the silicon atoms present, which esters invariably contain two silicon atoms.

According to a variant of the method, method (a) may be applied to the silicon alcohols as defined in method (b).

Thus, cyanoacetic esters are obtained which differ from the esters of the invention and have the general formula:

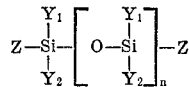

in which $X_1$ and $X_2$, which may be the same or different, represent an alkyl group, a halogenoalkyl or cyanoacetoxyalkyl group, in which the alkyl residue contains from 1 to 3 carbon atoms, phenyl or halogenophenyl group; $X_3$ represents a cyanoacetoxyalkyl group; and $n$ is a whole number from 1 to 40.

The $X_1$ and $X_2$ groups in the chain

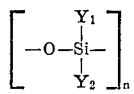

may vary from one silicon atom to another adjacent silicon atom in the chain, with all remaining defined as indicated above.

The products obtained according to the invention have a number of uses, such as heat-stable lubricants, hydraulic and thermal fluids in the textile, paper and leather industry, and also for the coating of glass fibers and as an intermediate synthesis product.

The following examples are given by way of illustration, but not by way of limitation, of the practice of this invention:

EXAMPLE 1

170 grams cyanacetic acid
194 grams bis(hydroxymethyl)tetramethyldisiloxane
200 cc. toluene
20 grams activated clay, available under the trade name "Clarsil PC1"

The above ingredients are introduced into a demijohn with three tubes and which is provided with an agitator and a coolant connected to the demijohn by means of an azeotropic decantation means.

The reaction mixture is heated to boiling and the toluene removes the water azeotropically as it forms. After three hours of reaction, the quantity of water collected is 36 cc.

The reaction mixture is filtered in order to remove the clay and then the toluene is distilled off.

310 grams of a light, transparent, colorless oil is obtained corresponding to a yield of 95% of theory, having the following analysis:

Calculated (percent): C, 43.95; H, 6.10; N, 8.53. Found (percent): C, 44.25; H, 5.80; N, 8.75.

The result of the analysis, the infra-red spectography and the nuclear magnetic resonance confirm the structure of the bis(cyanoacetoxymethyl)tetramethyldisiloxane. It has a boiling point above 200°/1 mm. Hg and a refraction index $n_D^{20}$ of 1.4492.

EXAMPLE 2

Example 1 is repeated with:

170 grams cyanoacetic acid
1000 grams bis(hydroxymethyl)hexacosimethyltridecisiloxane
500 cc. toluene
50 grams activated clay (Clarsil PC1)

After four hours of boiling, the amount of water collected is 34 cc. After separation, 1050 grams, corresponding to 92% of theory, of a viscous, transparent, colorless, undistillable oil are obtained having a refractive index of $n_D^{20}=1.4175$, and the following analysis:

Calculated (percent): C, 35.7; H, 7.51; N, 2.45. Found (percent): C, 35.5; H, 7.25; N, 2.25.

This corresponds to the structure of bis(cyanacetoxymethyl)hexacosimethyltridecisiloxane.

EXAMPLE 3

170 grams cyanoacetic acid
194 grams bis(hydroxymethyl)tetramethyldisiloxane
324 grams hexamethyldisiloxane
400 cc. benzene
30 grams activated clay (Clarsil PC1)

The ingredients are introduced into an apparatus identical with that of Example 1.

The reaction mixture is heated to 80° C. and the benzene azeotropically entrains the water as it forms. After three hours of reaction, the amount of water collected is 37 cc.

The reaction mixture is then filtered for removal of the clay and the benzene is distilled off along with excess hexamethyldisiloxane. The remaining liquid is distilled at 124° C./8 mm. Hg.

365 grams, corresponding to a theoretical yield of 75%, of a colorless liquid are obtained, having the following analysis:

Calculated (percent): C, 44.10; H, 7.70; N, 5.71. Found (percent): C, 44.35; H, 7.75; N, 5.80.

The analysis, the nuclear magnetic resonance and the infra-red spectography of the product establishes that it is cyanacetoxymethylpentamethyldisiloxane. It has a boiling point of 124° C./8 mm. Hg and a refraction index of $n_D^{20}=1.4251$.

It will be understood that changes may be made in the details of formulation and operation without departing from the spirit of the invention, especially as defined in the following claims.

I claim:

1. Cyanoacetic esters of silicon alcohols having the general formula:

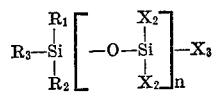

in which $R_1$, $R_2$ and $R_3$, which are the same or different, represent an alkyl group containing from 1 to 3 carbon atoms; $X_1$, $X_2$ and $X_3$, which are the same or different, represent a group selected from the group consisting of alkyl, halogenoalkyl, cyanoacetoxyalkyl group in which the alkyl residue contains from 1 to 3 carbon atoms, phenyl and halogenophenyl group, at least one of the substituents $X_1$, $X_2$ and $X_3$ being a cyanoacetoxyalkyl group and $n$ is a whole number of from 1 to 40.

2. A cyanoacetic ester of silicon alcohol as claimed in claim 1 in which the $X_1$ and $X_2$ groups in chain connec-

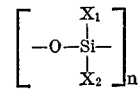

tion may vary from one silicon atom to another adjacent silicon atom in the chain.

3. A method for the preparation of cyanoacetic esters having the formula:

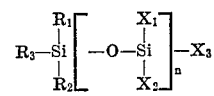

in which $R_1$, $R_2$ and $R_3$, which are the same or different, represent an alkyl group containing from 1 to 3 carbon atoms, $X_1$, $X_2$ and $X_3$, which are the same or different, represent a group selected from the group consisting of an alkyl, halogenoalkyl, cyanoacetoxyalkyl group in which the alkyl residue contains from 1 to 3 carbon atoms, phenyl and halogenophenyl group, at least one of the substituents $X_1$, $X_2$ and $X_3$ being a cyanoacetoxyalkyl group and $n$ is a whole number of from 1 to 40, comprising reacting a polyfunctional silicon alcohol with cyanoacetic acid and a hexaalkyldisiloxane in which the alkyl group contains from 1 to 3 carbon atoms.

4. The methods as claimed in claim 3 in which the silicon alcohol has the general formula:

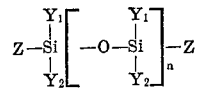

in which $Y_1$ and $Y_2$, which may be the same or different, represent a group selected from the group consisting of an alkyl, halogenoalkyl and hydroxyalkyl group in which the alkyl residue contains 1 to 3 carbon atoms, phenyl and halogenophenyl groups, Z represents a hydroxyalkyl group in which the alkyl residue contains 1 to 3 carbon atoms and $n$ is a whole number between 1 and 40.

5. The method as claimed in claim 3 in which the reaction is carried out at a temperature within the range of 35° C. to the boiling point temperature of the reaction mixture.

6. The method as claimed in claim 3 in which ther reaction is carried out in the presence of an acid catalyst.

7. The method as claimed in claim 3 which includes the step of removing the water of reaction and then the catalyst.

8. The method as claimed in claim 3 in which the groups $Y_1$ and $Y_2$ in the chain

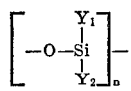

vary from one silicon atom to another adjacent silicon atom in the chain.

9. The method as claimed in claim 3 in which the hexa-alkyldisiloxane is employed in an amount two to five times the theoretical quantity.

10. The method as claimed in claim 3 in which the cyanoacetic acid is employed in an amount within the range of the stoichiometric quantity in relation to the OH functions to be esterified up to an excess of 10% above the theoretical quantity.

References Cited

FOREIGN PATENTS 1,199,772   3/1966   Germany _____ 260—448.2 N

OTHER REFERENCES

Noller, "Chemistry of Organic Compounds," W. B. Saunders Co., Philadelphia (1965), p. 183.

DELBERT E. GANTZ, Primary Examiner

P. F. SHAVER, Assistant Examiner

U.S. Cl. X.R.

117—126 GN; 252—49.6, 77; 260—46.5 E, 448.2 B, 448.2 E; 106—15 FP, 316